(12) United States Patent
Sano et al.

(10) Patent No.: US 7,031,364 B2
(45) Date of Patent: Apr. 18, 2006

(54) GAS LASER DEVICE AND EXPOSURE APPARATUS USING THE SAME

(75) Inventors: Naoto Sano, Utsunomiya (JP); Yoshiyuki Nagai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/163,402

(22) Filed: Sep. 30, 1998

(65) Prior Publication Data

US 2001/0046248 A1 Nov. 29, 2001

(30) Foreign Application Priority Data

Oct. 3, 1997 (JP) ............................................. 9-271253

(51) Int. Cl.
*H01S 3/22* (2006.01)

(52) U.S. Cl. ............................... 372/55; 372/57; 372/58
(58) Field of Classification Search ................. 372/57, 372/58
See application file for complete search history.

(56) References Cited

U.S. PATENT DOCUMENTS

| | | | | | |
|---|---|---|---|---|---|
| 4,274,065 | A | * | 6/1981 | Garscadden et al. | 372/58 |
| 4,611,326 | A | * | 9/1986 | McNamara | 714/798 |
| 4,611,327 | A | * | 9/1986 | Clark et al. | 372/58 |
| 4,785,458 | A | * | 11/1988 | Kuzumoto et al. | 372/56 |
| 5,023,884 | A | * | 6/1991 | Akins et al. | 372/57 |
| 5,250,797 | A | | 10/1993 | Sano et al. | 250/205 |
| 5,373,523 | A | * | 12/1994 | Fujimoto et al. | 372/57 |
| 5,383,217 | A | * | 1/1995 | Uemura | 372/58 |
| 5,440,578 | A | * | 8/1995 | Sandstrom | 372/57 |

(Continued)

FOREIGN PATENT DOCUMENTS

| | | |
|---|---|---|
| EP | 0 794 598 | 9/1997 |
| JP | 62-26881 | 2/1987 |
| JP | 62-109634 | 5/1987 |

(Continued)

OTHER PUBLICATIONS

McKee:"Spectral–narrowing technique for excimer laser oscillators";Canadian Journal of Physics,vol.63 ,1985,pp. 214–219.*
Japanese Official Action (Notice of Reason for Rejection) dated Jun. 18, 2002, plus excerpt English translation.
Japanese Official Action (Decision of Rejection) dated Oct. 1, 2002, plus excerpt English translation.

*Primary Examiner*—Phillip Nguyen
(74) *Attorney, Agent, or Firm*—Fitzpatrick, Cella, Harper & Scinto

(57) ABSTRACT

In a gas laser device, a laser gas sealingly stored in a chamber is excited using a discharging electrode that is electrically discharged. Laser light produced by the electrical discharging is totally reflected by a total reflection mirror. An output window partially reflects the laser light and outputs a portion of the laser light reflected between the total reflection mirror and the output window. A blower circulates the laser gas within the chamber so that the laser gas passing an electrical discharging region of the discharging electrode is circulated in the chamber and is returned to the electrical discharging region of the discharging electrode. The blower is operated according to the state of electrical discharging from the discharging electrode. The blower operation includes operating rotation of the blower in a stand-by state in which no laser gas is excited by the electrical discharging from said discharging electrode so that no laser light is emitted but the gas laser device is in a condition to output the laser light, and operating rotation of the blower in an in-operation state in which the laser gas is excited by the electrical discharging from said discharge electrode and laser light is outputted.

39 Claims, 3 Drawing Sheets

U.S. PATENT DOCUMENTS

| | | | |
|---|---|---|---|
| 5,450,436 A | * 9/1995 | Mizoguchi et al. | 372/57 |
| 5,463,650 A | 10/1995 | Ito et al. | 372/57 |
| 5,567,928 A | 10/1996 | Sano | 250/205 |
| 5,586,134 A | * 12/1996 | Das et al. | 372/38 |
| 5,770,933 A | * 6/1998 | Larson et al. | 318/254 |
| 5,946,138 A | * 8/1999 | Mizouchi | 359/618 |
| 5,978,070 A | * 11/1999 | Sakuma et al. | 355/53 |
| 6,023,486 A | * 2/2000 | Hofmann et al. | 372/58 |
| 6,061,376 A | * 5/2000 | Hofmann et al. | 372/58 |
| 6,144,686 A | * 11/2000 | Hofmann et al. | 372/58 |
| 6,195,378 B1 | * 2/2001 | Hofmann | 372/58 |

FOREIGN PATENT DOCUMENTS

| | | | |
|---|---|---|---|
| JP | 62-281484 | | 12/1987 |
| JP | 63-86587 | | 4/1988 |
| JP | 63-70081 | | 5/1988 |
| JP | 64-15249 | | 1/1989 |
| JP | 1-291477 | | 11/1989 |
| JP | 2-13769 | | 1/1990 |
| JP | 2-69785 | | 3/1990 |
| JP | 2-294013 | | 12/1990 |
| JP | 3-46787 | | 2/1991 |
| JP | 3-70426 | | 3/1991 |
| JP | 03201493 A | * | 9/1991 |
| JP | 3-295285 | | 12/1991 |
| JP | 4-22181 | | 1/1992 |
| JP | 4-57077 | | 2/1992 |
| JP | 5-62873 | * | 3/1993 |
| JP | 5-190435 | * | 7/1993 |
| JP | 6-140695 | | 5/1994 |
| JP | 6-151282 | * | 5/1994 |
| JP | 8-45828 | * | 2/1996 |
| JP | 8-161033 | * | 6/1996 |
| JP | 8-167565 | * | 6/1996 |
| JP | 10097986 A | * | 4/1998 |
| WO | WO 94/11932 | | 5/1994 |

* cited by examiner

GAS LASER DEVICE AND EXPOSURE APPARATUS USING THE SAME

FIELD OF THE INVENTION AND RELATED ART

This invention relates to a gas laser device such as a noble gas halide excimer laser device or an $F_2$ laser device, for example. In another aspect, the invention is concerned with an exposure apparatus or a semiconductor device manufacturing method wherein such a gas laser device is used as an exposure light source.

In the field of semiconductor device production or other fields, a noble gas halide excimer laser (hereinafter, simply "excimer laser"), which is one of the types of gas lasers, has attracted much attention as a high power laser. As for such an excimer laser, there are an XeCl excimer laser (308 nm wavelength), a KrF excimer laser (248 nm wavelength), and an ArF excimer laser (193 nm wavelength), for example. Similarly, an $F_2$ laser (158 nm wavelength) has attracted much attention as a high power laser. Also, semiconductor device manufacturing exposure apparatuses of the step-and-repeat type or step-and-scan type having a KrF excimer laser (248 nm wavelength) as an exposure light source have already been used in practice.

In excimer lasers, a laser gas containing a noble gas and a halogen gas is sealingly stored in a chamber, and the laser gas is once excited by electrical discharging from an electrode, provided in the chamber, whereby laser light is produced. Also, in $F_2$ lasers, an $F_2$ gas is sealingly stored in a chamber, and the laser gas is once excited by electrical discharging from an electrode, provided in the chamber, whereby laser light is produced.

SUMMARY OF THE INVENTION

In such excimer lasers or $F_2$ lasers, it is necessary to circulate the laser gas within the chamber in order to feed the laser gas to the electric discharging field of the electrode. To this end, within the chamber, there is circulating means for laser gas circulation such as a blowing machine (blower or circulating fan), for example. If the lifetime of the blowing machine provided in the chamber is short, the operation of the laser has to be stopped frequently for replacement of the laser or blowing machine or for repair of the same. In cases where the laser is used as a light source in an exposure apparatus, it largely affects the productivity of the apparatus. Since the blowing machine is disposed within the chamber, it takes much time for replacement or repair of the same.

A factor that influences the lifetime of the blowing machine may be the lifetime of bearing means for holding a rotational shaft of blowing fans of the blowing machine. Generally, the lifetime of each bearing means is shorter with a larger load applied, in operation. Therefore, if the number of revolutions of the blowing fans is enlarged to increase the blowing power of the blowing machine, with a result of enlargement of the load applied to the bearing means for supporting the rotational shaft, it accelerates wear and shortens the lifetime of the bearing. Namely, if the blades of the blowing machine are rotated at a high speed for high frequency laser oscillation, the lifetime of the bearing means for supporting the blade rotational shaft of the blowing machine is shortened.

However, in an exposure apparatus having an excimer laser, for example, as an exposure light source, normally it is required that the excimer laser is oscillated at a high frequency for improved processing performance of the apparatus. Therefore, it is not practical to use the blowing machine at its low blowing power level for prolongation of the lifetime of the bearing. On the other hand, for the reasons described above, if replacement or repair of the excimer laser or the blowing machine occurs frequently, in an exposure apparatus having an excimer laser as an exposure light source, it leads to decreased productivity or throughput.

Further, in gas laser devices, the lifetime of the blowing machine disposed in the chamber where the laser gas is stored should be longer than the lifetime of at least the chamber.

It is accordingly an object of the present invention to provide a gas laser device having a long lifetime and a high power.

It is another object of the present invention to provide an exposure apparatus or a device manufacturing method that use such a gas laser device as an exposure light source, whereby high productivity is assured.

In accordance with an aspect of the present invention, there is provided a gas laser device, comprising: a chamber for sealingly storing a laser gas therein; a discharging electrode for exciting the laser gas through electrical discharging, so that laser light is outputted from said chamber; circulating means for circulating the laser gas within said chamber so that the laser gas passing an electric discharging region of said discharging electrode is circulated in said chamber and is returned to said electrical discharging region of said discharging electrode; and control means for controlling said circulating means so that said circulating means provides different gas circulation capacities, being different for an in-operation state in which the laser gas is excited by electrical discharging from said discharging electrode and the laser light is outputted and for a stand-by state which differs from said in-operation state but in which laser light can be outputted.

Said control means may be operable to stop the gas circulation through said circulating means when said gas laser device is in said stand-by state. Said circulating means may include a blowing machine provided within said chamber. Said blowing machine may have a blowing blade rotatably supported within said chamber. Said laser device may comprise one of a noble gas halide excimer laser and an $F_2$ laser. Said noble gas halide excimer laser may comprise one of an XeCl excimer laser, a KrF excimer laser, and an ArF excimer laser.

In accordance with another aspect of the present invention, there is provided an exposure apparatus for exposing a substrate with the laser light, comprising: a laser light source having a chamber for sealingly storing a laser gas therein, a discharging electrode for exciting the laser gas through electrical discharging, so that laser light is outputted from said chamber, and circulating means for circulating the laser gas within said chamber so that the laser gas passing an electrical discharging region of said discharging electrode is circulated in said chamber and is returned to said electrically discharging region of said discharging electrode; a major assembly for exposing a substrate with laser light from said laser light source; and control means for controlling said circulating means so that said circulating means provides different gas circulation capacities, being different for an in-operation state in which the laser gas is excited by electrical discharging from said discharging electrode and the laser light is outputted and for a stand-by state which differs from said in-operation state but in which laser light can be outputted.

Said control means may be operable to stop the gas circulation through said circulating means when said gas laser device is in said stand-by state. Said circulating means may include a blowing machine provided within said chamber. Said blowing machine may have a blowing blade rotatably supported within said chamber. Said laser device may comprise one of a noble gas halide excimer laser and an $F_2$ laser. Said noble gas halide excimer laser may comprise one of an XeCl excimer laser, a KrF excimer laser, and an ArF excimer laser.

In accordance with a further aspect of the present invention, there is provided an exposure apparatus, comprising: a laser light source having (i) a chamber for sealingly storing a laser gas therein, (ii) a discharging electrode for exciting the laser gas through electrical discharging so that laser light is outputted from said chamber, and (iii) circulating means for circulating the laser gas within said chamber so that the laser gas passing an electrical discharging region of said discharging electrode is circulated in said chamber and is returned to said electric discharging region of said discharging electrode; a main assembly for exposing a substrate with the laser light from said laser light source; and control means for controlling said circulating means so that said circulating means provides different gas circulation capacities, being different for an exposure-operation state of said exposure apparatus in which exposure of the substrate with the laser light from said laser light source can be performed through said main assembly, and for a non-exposure-operation state of said exposure apparatus.

Said control means may be operable to increase the gas circulation capacity of said circulating means in response to a start of an exposure job in which the exposure operation is performed through said main assembly. Said control means may be operable to hold gas circulation through said circulating means stopped before a start of the exposure job. Said circulating means may include a blowing machine provided within said chamber. Said blowing machine may have a blowing blade rotatably supported within said chamber. Said laser light source may comprise one of a noble gas halide excimer laser and an $F_2$ laser. Said noble gas halide excimer laser may comprise one of an XeCl excimer laser, a KrF excimer laser, and an ArF excimer laser.

In accordance with a further aspect of the present invention, there is provided a semiconductor device manufacturing method in which a pattern is lithographically transferred onto a substrate by use of any one of the exposure apparatuses as described above.

These and other objects, features and advantages of the present invention will become more apparent upon-a consideration of the following description of the preferred embodiments of the present invention taken in conjunction with the accompanying drawings.

DESCRIPTION OF THE PREFERRED EMBODIMENTS

Figure 1:
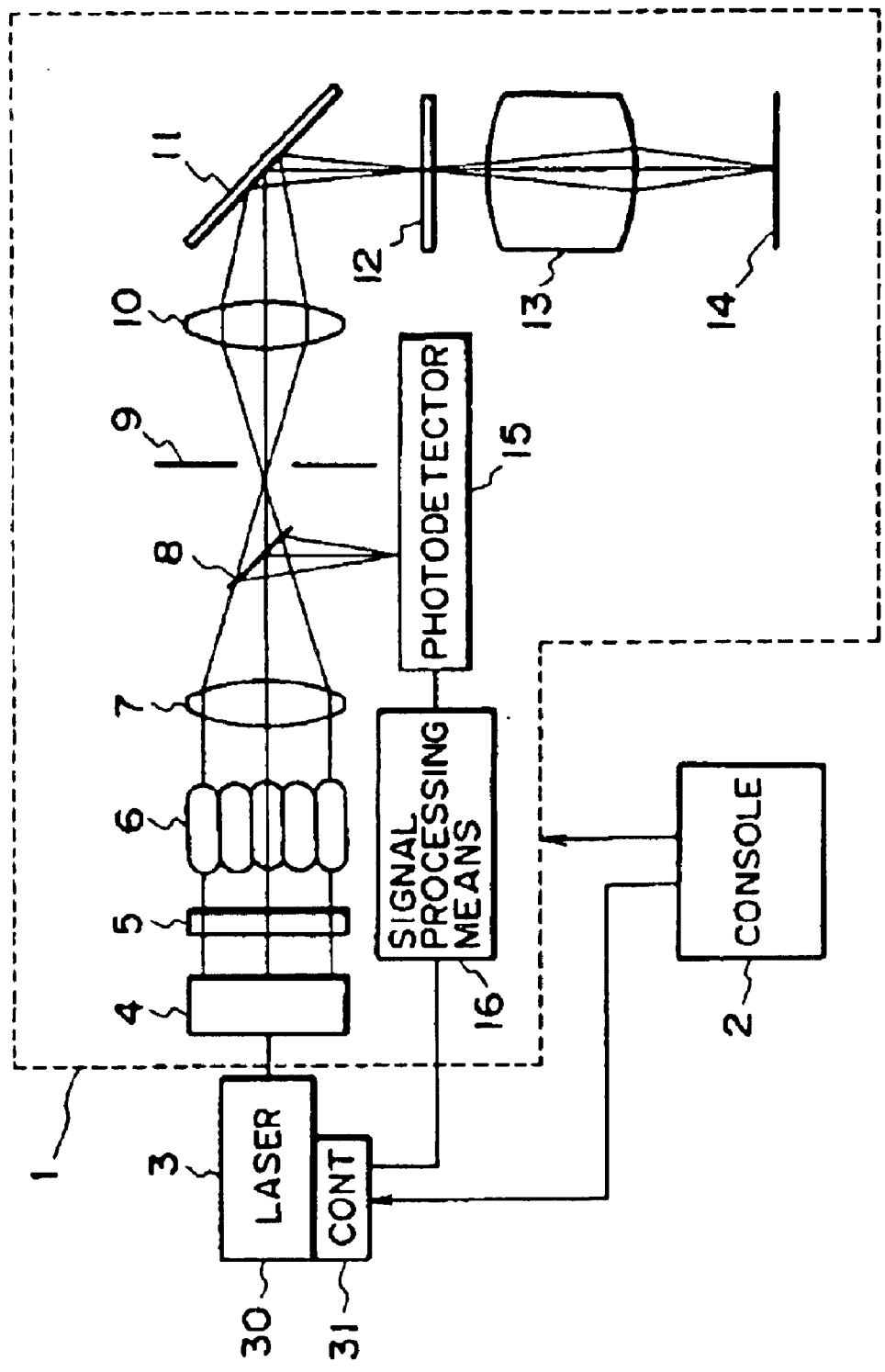
FIG. 1 is a schematic view of an exposure apparatus with a gas laser device, according to an embodiment of the present invention.

FIG. 1 shows an exposure apparatus according to an embodiment of the present invention. Denoted in FIG. 1 at 1 is a main assembly of a step-and-repeat or step-and-scan exposure apparatus, called a stepper. Denoted at 2 is a console with which an operator, for example, can apply a job command to a control system (not shown) in the exposure apparatus main assembly 1, for controlling the operation of the main assembly. Denoted at 3 is a laser light source having a gas laser device which is based on a noble gas halide excimer laser (called "excimer laser"), or an $F_2$ laser, for example. Examples of such an excimer laser may be an XeCl excimer laser (308 nm wavelength), a KrF excimer laser (248 nm wavelength), and an ArF excimer laser (193 nm wavelength). The following description will be made of an example wherein the laser light source 3 uses a noble gas halide excimer laser.

The main assembly 1 of the exposure apparatus comprises a beam shaping optical system 4 for rectifying, into a desired beam shape, the sectional shape of laser light from the laser light source 3, along the path of laser light (laser beam). The main assembly further comprises a variable ND filter 5 for adjusting the intensity of laser light, and an optical integrator 6 for dividing the laser light and superposing the divided beams one upon another for uniform illuminance upon the surface of a reticle 12. The main assembly further comprises a condenser lens 7 for collecting laser light from the optical integrator 6, and a beam splitter 8 for directing a portion of the laser light from the condenser lens 7 toward a photodetector 15. The main assembly further comprises a masking blade 9 disposed at a position where the laser light is collected by the condenser lens 7 and for regulating the range on the reticle 12 surface to be irradiated with the laser light. The main assembly further comprises an imaging lens 10 for forming an image of the masking blade 9 upon the reticle 12, and a mirror 11 for directing the path of laser light toward the optical axis direction of a projection lens 13.

The reticle 12 can be illuminated with laser light projected by the laser light source 3 and passed through the illumination optical system having optical components such as described above. With this illumination, a pattern of the reticle is projected by the projection lens (projection optical system) 13 onto one of different exposure shot areas on a semiconductor wafer (substrate) in a reduced scale of ½ to 1/10, whereby the pattern is lithographically transferred thereto. The wafer 14 can be moved two-dimensionally along a plane perpendicular to the optical axis of the projection lens 13, by means of a movable stage (not shown). As the exposure of a certain shot area on the wafer is completed, the wafer is moved to the position where the pattern of the reticle 12 is to be projected by the projection lens 13 onto a next shot area on the wafer.

Denoted at 16 is signal processing means for processing a photoelectrically converted signal, having been photoelectrically converted by the photodetector 15 and corresponding to the intensity of the laser light. Through integration of photoelectrically converted signals, a signal for controlling the exposure amount can be produced. A control signal obtained with the signal processing through the signal processing means 16 is fed back to a controller 31 of the laser light source 3. In accordance with this control signal, the controller 31 controls the subsequent light emission by the laser gas in the chamber 30 of the excimer laser 3.

Figure 2:
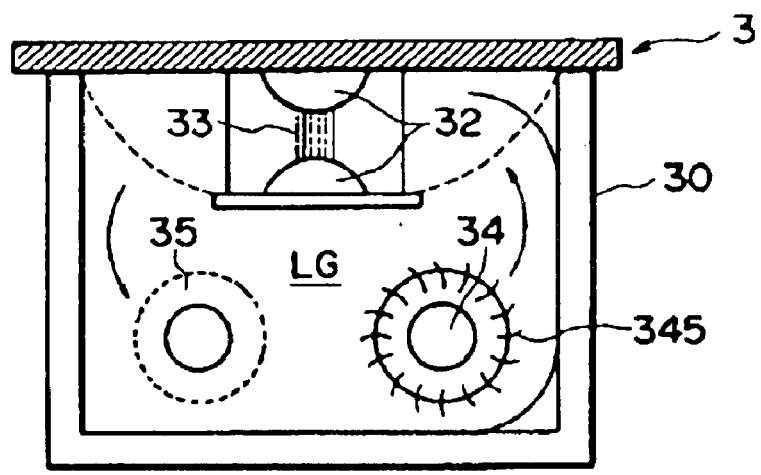
FIG. 2 is a longitudinal section of a chamber of the gas laser device.

FIG. 2 is a longitudinal section of the chamber 30 of the excimer laser 3. Denoted in FIG. 2 at 32 is a pair of discharging electrodes which are connected to a high voltage source (HV), not shown. On the basis of the electrical discharging from the discharging electrodes 32, the laser gas LG portion which is placed in the discharging region 33 between the discharging electrodes 32 is excited, whereby laser oscillation is executed in a known manner. The electrical discharging from the discharging electrodes 32 is repeated periodically, such that as shown in FIG. 3 the excimer laser 3 provides periodic outputs or oscillation of laser light 40.

The laser gas LG within the chamber 30 of the excimer laser 3 is circulated in the chamber 30 in directions (counterclockwise in FIG. 2) denoted by arrows in the drawing, by means of a blower or circulating fan 34 of a blowing machine (circulating means), which is provided within the chamber 30. Thus, the laser gas LG passing the electrical discharging region 33 of the discharging electrodes 32 is circulated in the chamber 30 and is moved back to the discharging region 33 of the electrodes 32. During this circulation process, the laser gas LG passes around a heat exchanger 35 so that it is cooled to a desired temperature. Within the heat exchanger 35, there is a flow of temperature regulating fluid such as temperature controlled water or air, which is supplied from a temperature adjusted fluid supplying device (not shown) disposed outside the chamber 30.

Figure 3:
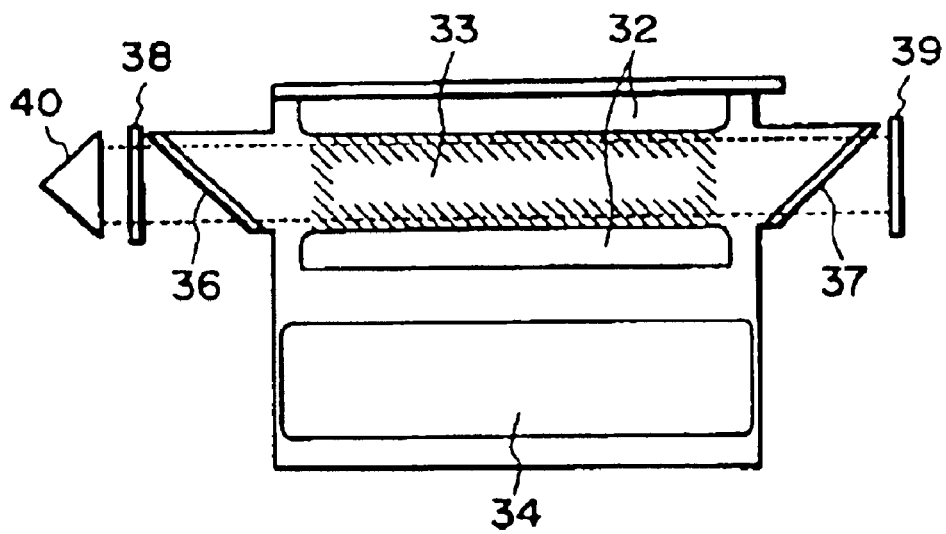
FIG. 3 is a lateral section of the chamber of the gas laser device.
Figure 4:
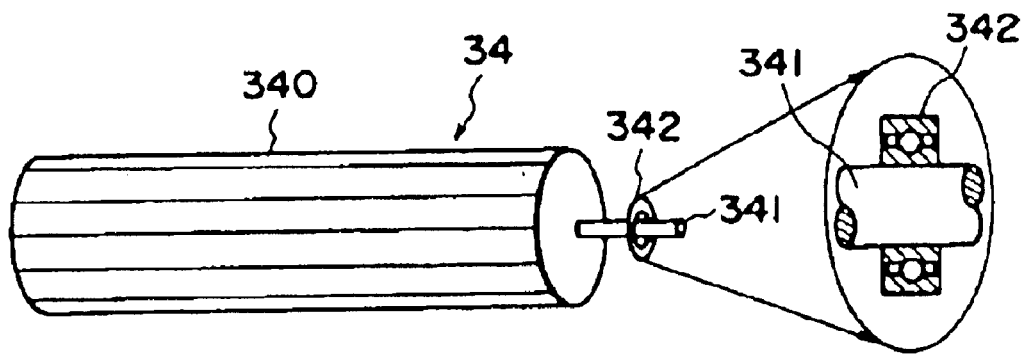
FIG. 4 is a schematic view for explaining details of a rotational shaft of a blower.

As shown in FIG. 3, there are windows 36 and 37 before and after the electrical discharging region 33 in the chamber 30 of the excimer laser 3. The laser light produced at the discharging region 33 is amplified while being passed through the windows 36 and 37 and being reflected by an output window (half mirror) 38 (which is a laser output end) and a total reflection mirror 39. A portion of the thus amplified laser light is outputted from the output window (half mirror) 38, whereby laser light 40 is emitted as exposure light. During this process, the blower 34 is continuously rotated to circulate the laser gas LG within the chamber 30 as described above. When the laser oscillation frequency has to be increased, the number of revolutions of a blower drum 340 (FIG. 4) of the blower 34 is increased to enhance the blowing power of the blower accordingly.

Around the blower drum 340, there are a number of blades (blowing fans) 345, as shown in FIG. 2, mounted. With the rotation of the blower drum 240, these blades 345 operate to circulate the laser gas LG within the chamber 30. The blower drum 340 has a rotational shaft 341 which is rotatably supported by bearing means (rotational shaft supporting means) such as by ball bearing 342, for example. The lifetime of the ball bearing 342 changes with the load applied to the ball bearing 342, and the load changes with the rotation speed or rotation time of the blower drum 340.

Figure 5:
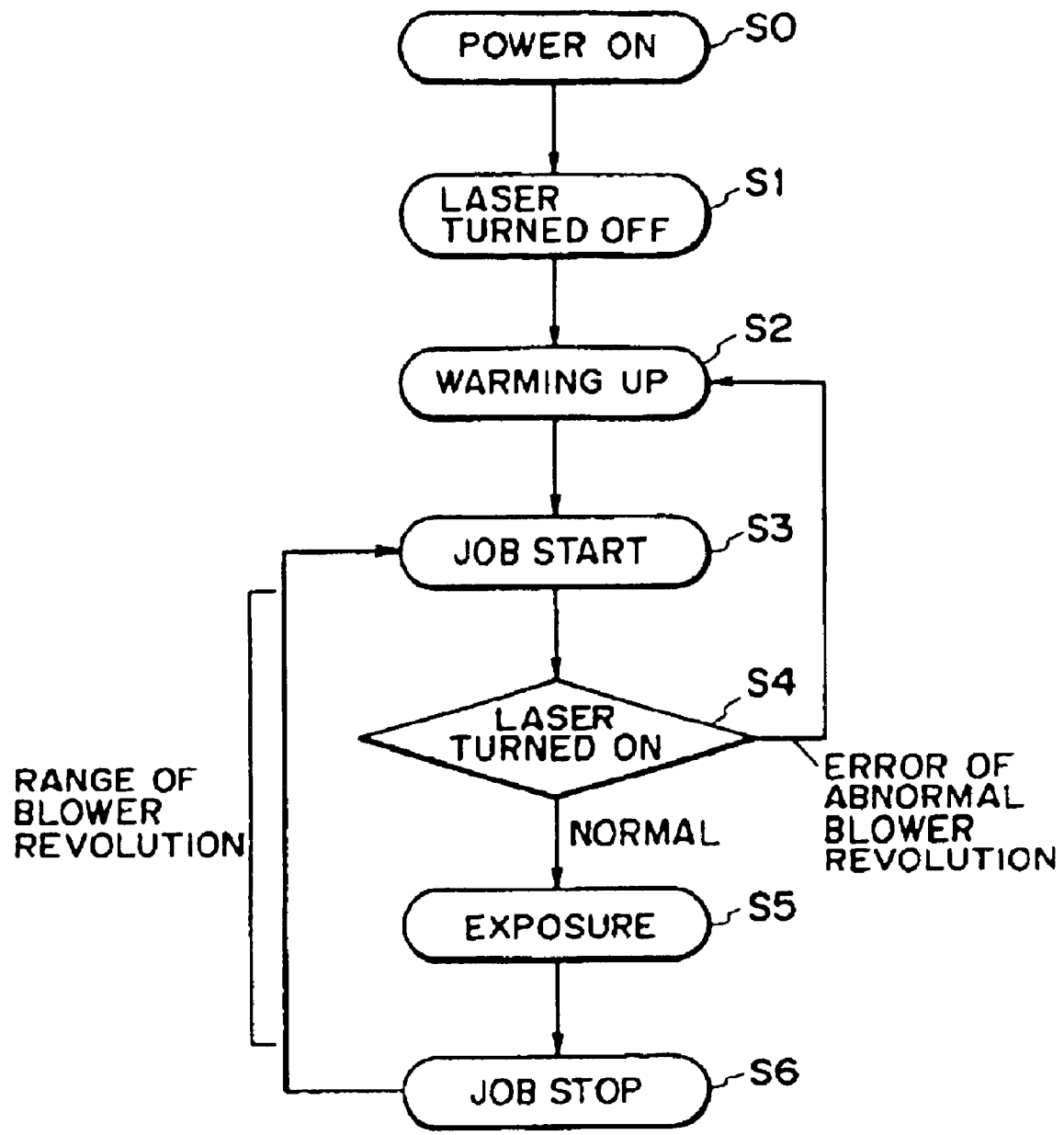
FIG. 5 is a flow chart for explaining operation with the gas laser device of this embodiment.

The operation of this embodiment will now be described with reference to the flow chart of FIG. 5. As a voltage source for the excimer laser 3 (laser light source) is powered on at step S0, the sequence goes to a warming-up state at step S2 while the laser is kept in a laser-off state at step S1. In the warming-up state at step S2, the electrical discharging from the discharging electrodes 32 is not initiated, and also the blower 34 is kept stopped. The remaining functions are operated such that, in this state, in response to a start of electrical discharging from the discharging electrodes 32, the laser emission can be executed promptly.

In this state, if at step S3 an exposure job start signal, for example, is applied from the console 2 of FIG. 1 to the stepper main assembly 1 and the excimer laser 3, the electrical discharging from the discharging electrodes 32 of the excimer laser 3 is initiated. Simultaneously, the blower 34 starts its rotation to initiate circulation of the laser gas LG in the chamber 30. Thus, the excimer laser is brought into a laser-on state at step S4, such that laser light 40 is produced from the output window 38 of FIG. 3. On the other hand, within the stepper main assembly 1, a wafer 14 introduced into the main assembly 1 is taken out of a wafer cassette, and it is placed on a wafer stage (not shown) which is placed at an exposure position below the projection lens 13. Additionally, after execution of a predetermined alignment operation with respect to a reticle 12, the exposure process is performed at step S5 by using the laser light 40 as exposure light. The exposure operation in the stepper main assembly 1 is repeatedly and sequentially performed until exposures of all wafers 14 set beforehand are completed.

Until the exposure operation at step S5 is completed, the blower 34 in the chamber 30 continues its rotation to continue its blowing operation. During this period, at step S4, the laser controller 31 continuously detects the rotation speed (number of revolutions) of the blower 34. If there is any error in the number of blower revolutions, the electrical discharging from the discharging electrodes 32 is discontinued. Also, the blower 34 rotation is stopped. By this, the laser goes back to the warming-up state at step S2. On that occasion, the laser controller 31 signals the error in the laser 3 to the console 2, such that the console 2 applies a signal to the stepper main assembly 1 to stop the job being executed, whereby the exposure operation in the stepper main assembly 1 is stopped.

If, on the other hand, any error in the number of revolutions is not detected, the exposure operation at step S5 is continued, and the exposure job is performed until exposures of all the wafers 14 set in the stepper main assembly 1 are completed. When, at step S6, exposures of all the wafers 14 in the stepper main assembly 1 are-completed and the exposure job thereto is accomplished, the stepper main assembly 1 signals the exposure job completion to the console 2. In response, the console 2 signals the exposure job completion in the main assembly 1 to the controller 31 of the laser 3. In response, the laser controller 31 stops the blower 34 rotation and, additionally, it stops the electrical discharging from the discharging electrodes 32 whereby laser oscillation from the excimer laser 3 is stopped.

In this embodiment, the blower 34 rotates only in a period in which an exposure operation is performed in the stepper main assembly 1 or in a period in which the excimer laser 3 provides laser light oscillation. On the other hand, in the stepper main assembly 1, there is a job, other than the exposure job, which necessitates oscillation of the excimer laser 3 for measurement of illuminance non-uniformness upon a reticle 12 or a wafer 14, or for temperature stabilization of the projection lens 13, for example. During a period in which such a job is executed, the blower 34 is rotated. In accordance with this embodiment of the present invention, the period of term for replacement or repair of the blower 34 or bearing means 342, that is, the lifetime of it, can be prolonged. Particularly, the lifetime of the blower 34 may be made longer than that of the chamber 30.

While the invention has been described with reference to the structures disclosed herein, it is not confined to the details set forth and this application is intended to cover such modifications or changes as may come within the purposes of the improvements or the scope of the following claims.

What is claimed is:

1. A gas laser device, comprising:
   a chamber for confining a laser gas therein;
   discharging electrodes for exciting the laser gas through electrical discharging;
   a reflection mirror for reflecting laser light produced by the electrical discharging from said discharging electrode;
   an output half-mirror for reflecting the laser light and for outputting a portion of the laser light amplified between said reflection mirror and said output half-mirror spaced for resonant reflection of the laser light;

a blower rotatable in the chamber for recirculating the laser gas within said chamber through an electrical discharging region of said discharging electrodes; and operating means including first means for operating the blower at a first rotational speed in an operational state in which the laser gas is excited by the electrical discharging from said discharge electrodes to output the laser light and second means for operating the blower at a second rotational speed lower than the first rotational speed in which laser gas is not excited by the electrical discharging from said discharging electrodes for outputting the laser light.

2. A gas laser device according to claim 1, wherein the second rotational speed is zero.

3. A gas laser device according to claim 2, wherein said blower has a blowing blade rotatably supported within said chamber.

4. A gas laser device according to claim 1, wherein said gas laser device comprises a noble gas halide excimer laser.

5. A gas laser device according to claim 4, wherein said noble gas halide excimer laser comprises an XeCl excimer laser.

6. A gas laser device according to claim 1, further comprising an exposure apparatus for exposing a substrate to the laser light supplied from said gas laser device.

7. A gas laser device according to claim 6, wherein said second means operates rotation of said blower when said gas laser device is in the stand-by state by stopping the blower.

8. A gas laser device according to claim 7, wherein said blower has a blowing blade rotatably supported within said chamber.

9. A gas laser device according to claim 7, wherein said gas laser device comprises a noble gas halide excimer laser.

10. A gas laser device according to claim 9, wherein said noble gas halide excimer laser comprises an XeCl excimer laser.

11. In an exposure apparatus having a main assembly for exposing a substrate to a laser light from a laser source, the laser source comprising:

(i) a chamber for confining a laser gas therein, (ii) discharging electrodes for exciting the laser gas through electrical discharging, (iii) a reflection mirror for reflecting laser light produced by the electrical discharging from said discharging electrodes, (iv) an output half mirror for reflecting the laser light and for outputting a portion of the laser light reflected between said reflection mirror and said output half-mirror spaced for resonant reflection of the laser light, and (v) a blower rotatable in the chamber for recirculating the laser gas within said chamber through an electrical discharging region of said discharging electrodes;

operating means including first means for operating the blower at a first rotational speed in an exposure operating state in which the laser gas is excited by the electrical discharging from said discharge electrodes to output the laser light and second means for operating the blower at a second rotational speed lower than the first rotational speed in which no laser gas is excited by the electrical discharging from said discharging electrodes for outputting the laser light.

12. An apparatus according to claim 11, wherein said operating means further comprises means for increasing a rotation speed of said blower in response to a start of an exposure job in which the exposure operation is performed through said main assembly.

13. An apparatus according to claim 12, wherein the second rotational speed is zero.

14. An apparatus according to claim 13, wherein said blower has a blowing blade rotatably supported within said chamber.

15. An apparatus according to claim 11, wherein said laser source comprises a noble gas halide excimer laser.

16. An apparatus according to claim 15, wherein said noble gas halide excimer laser comprises an XeCl excimer laser.

17. A gas laser operating method comprising:

confining a laser gas in a chamber;

exciting, using discharging electrodes, the laser gas through electrical discharge;

reflecting laser light produced by the electrical discharging from the discharging electrodes by a reflection mirror;

reflecting the laser light by an output half-mirror and outputting a portion of the laser light reflected between the reflection mirror and the output half-mirror spaced for resonant reflection of the laser light;

recirculating, using a blower rotatable in the chamber, the laser gas within the chamber, through an electrical discharging region of the discharging electrodes; and operating the blower at a first rotational speed in an operational state in which the laser gas is excited by the electrical discharging from the discharge electrodes to output the laser light and operating the blower at a second rotational speed lower than the first rotational speed in which laser gas is not excited by the electrical discharging from the discharging electrodes for outputting the laser light.

18. A gas laser device according to claim 1, wherein said gas laser device comprises an $F_2$ laser.

19. A gas laser device according to claim 4, wherein said noble gas halide excimer laser comprises a KrF excimer laser.

20. A gas laser device according to claim 4, wherein said noble gas halide excimer laser comprises an ArF excimer laser.

21. A gas laser device according to claim 7, wherein said gas laser device comprises an $F_2$ laser.

22. A gas laser device according to claim 9, wherein said noble gas halide excimer laser comprises a KrF excimer laser.

23. A gas laser device according to claim 9, wherein said noble gas halide excimer laser comprises an ArF excimer laser.

24. An apparatus according to claim 11, wherein said laser source comprises an $F_2$ laser.

25. An apparatus according to claim 15, wherein said noble gas halide excimer laser comprises a KrF excimer laser.

26. An apparatus according to claim 15, wherein said noble gas halide excimer laser comprises an ArF excimer laser.

27. A gas laser device comprising:

a chamber for confining a laser gas therein;

discharging electrodes for exciting the laser gas through electrical discharge;

a reflection mirror for amplifying laser light produced by the electrical discharging from said discharging electrodes;

an output half-mirror for amplifying the laser light and for outputting a portion of the laser light amplified between said reflection mirror and said output half-mirror spaced for resonant reflection of the laser light;

recirculating means rotatable in the chamber for recirculating the laser gas within said chamber, through an electrical discharging region of said discharging electrodes; and control means for controlling said recirculating means in an in-operation state to provide a first gas circulation rate in which the laser gas is excited by the electrical discharging from said discharging electrodes to output the laser light and controlling said recirculating means in a stand-by state to provide a second gas recirculating rate lower than the first gas recirculating rate in which no laser gas is excited by the electrical discharging from said discharging electrodes for outputting laser light.

28. A gas laser device according to claim 27, wherein said control means is operable to cause gas circulation by said means to stop in the stand-by state.

29. A gas laser device according to claim 27, wherein said recirculation means includes a blower provided within said chamber.

30. A gas laser device according to claim 29, wherein said blower has a blower blade rotatably supported within said chamber.

31. A gas laser device according to claim 27, wherein said gas laser device comprises one of a noble gas halide excimer laser and an $F_2$ laser.

32. A gas laser device according to claim 31, wherein said noble gas halide excimer laser comprises one of an XeCl excimer laser, a KrF excimer laser, and an ArF excimer laser.

33. In an exposure apparatus having a main assembly for exposing a substrate to a laser light from a laser light source, the laser light source comprising:

(i) a chamber for confining a laser gas therein;

(ii) discharging electrodes for exciting the laser gas through electrical discharge;

(iii) a reflection mirror for amplifying laser light produced by the electrical discharging from said discharging electrodes;

(iv) an output half-mirror for amplifying the laser light and for outputting a portion of the laser light amplified between said reflection mirror and said output half-mirror spaced for resonant reflection of the laser light;

(v) recirculation means rotatable in the chamber for recirculating the laser gas within said chamber, through an electrical discharging region of said discharging electrodes; and (vi) control means for controlling said recirculating means in an exposure state to provide a first gas circulation rate in which the laser gas is excited by the electrical discharging from said discharging electrodes to output the laser light and controlling said recirculating means in a non-exposure state to provide a second gas recirculating rate lower than the first gas recirculating rate in which no laser gas is excited by the electrical discharging from said discharging electrodes for outputting laser light.

34. An apparatus according to claim 33, wherein said control means is operable to increase the gas circulation rate of said recirculation means in response to a start of an exposure job in which the exposure operation is performed by the exposure apparatus.

35. An apparatus according to claim 34, wherein said control means is operable to stop said recirculation means in the absence of a start of the exposure job.

36. An apparatus according to claim 35, wherein said recirculation means includes a blower provided within said chamber.

37. An apparatus according to claim 36, wherein said blower has a blower blade rotatably supported within said chamber.

38. A semiconductor device manufacturing method comprising the steps of:

transferring a predefined pattern onto a substrate by use of an exposure apparatus; and manufacturing a semiconductor device from the patterned substrate, wherein said exposure apparatus includes (I) a laser light source that includes (i) a chamber for confining a laser gas therein, (ii) discharging electrodes for exciting the laser gas through electrical discharge, (iii) a reflection mirror for amplifying laser light produced by the electrical discharging from said discharging electrodes, (iv) an output half-mirror for amplifying the laser light and for outputting a portion of the laser light amplified between said reflection mirror and said output half-mirror spaced for resonant reflection of the laser light, and (v) recirculation means rotatable in the chamber for recirculating the laser gas within said chamber, through an electrical discharging region of said discharging electrodes; (II) a main assembly for exposing the substrate to the laser light from said laser light source; and (III) control means for controlling said recirculating means in an exposure state to provide a first gas circulation rate in which the laser gas is excited by the electrical discharging from said discharging electrodes to output the laser light and controlling said recirculating means in a non-exposure operating state to provide a second gas recirculating rate lower than the first gas recirculating rate in which no laser gas is excited by the electrical discharging from said discharging electrodes for outputting laser light.

39. A semiconductor manufacturing method, comprising the steps of:

transferring a predefined pattern onto a substrate by use of an exposure apparatus; and manufacturing a semiconductor device from the patterned substrate, wherein the exposure apparatus includes (I) a gas laser device having (i) laser gas supplying means in a chamber for supplying a laser gas to an exciting region in the chamber, and (ii) exciting means for exciting the laser gas supplied to the exciting region; a main assembly for exposing the substrate to the laser light from said laser light source; and (II) control means for controlling said laser gas supplying means on the basis of whether the laser gas is to be excited by said exciting means or not and wherein said supplying means operates to supply the laser gas at a first circulating rate in response to the laser gas being excited by the exciting means and operates to supply the laser gas at a second gas circulating rate lower than the first gas circulating rate in response to the laser gas not being excited by the exciting means.

* * * * *

UNITED STATES PATENT AND TRADEMARK OFFICE
CERTIFICATE OF CORRECTION

| | | |
|---|---|---|
| PATENT NO. | : 7,031,364 B2 | Page 1 of 1 |
| APPLICATION NO. | : 09/163402 | |
| DATED | : April 18, 2006 | |
| INVENTOR(S) | : Naoto Sano et al. | |

It is certified that error appears in the above-identified patent and that said Letters Patent is hereby corrected as shown below:

ON THE TITLE PAGE:
    In item "(*) Notice:," after the first paragraph, insert the following paragraph:

-- This patent issued on a continued prosecution application filed
           under 37 CFR 1.53(d), and is subject to the twenty year patent
           term provisions of 35 U.S.C. 154(a)(2). --

In item "(56) References Cited, " under "FOREIGN PATENT DOCUMENTS," in the "(Continued)" section on page 2, in the second column, the sixth-listed document
"JP    03201493    A *    9/1991" should read
-- JP    03-201493    A *    9/1991 --; and the seventeenth-listed document
"JP    10097986    A *    4/1998" should read -- JP    10-097986    A *    4/1998 --.

COLUMN 2:
    Line 16, "use" should read -- uses --.

COLUMN 6:
    Line 23, "any" should read -- no --.
    Line 24, "not" should be deleted.
    Line 28, "are-completed" should read -- are completed --.

Signed and Sealed this

Nineteenth Day of December, 2006

JON W. DUDAS
*Director of the United States Patent and Trademark Office*